United States Patent [19]

Harada et al.

[11] Patent Number: 5,322,206

[45] Date of Patent: Jun. 21, 1994

[54] GOLF CLUB HEAD AND A PROCESS FOR PRODUCING THE SAME

[75] Inventors: Mutsumi Harada; Toshiharu Hoshi, both of Shizuoka, Japan

[73] Assignee: Yamaha Corporation, Japan

[21] Appl. No.: 854,807

[22] Filed: Mar. 19, 1992

[30] Foreign Application Priority Data

Mar. 19, 1991 [JP] Japan ................. 3-055168
Mar. 19, 1991 [JP] Japan ................. 3-081549

[51] Int. Cl.⁵ ............................................. B23K 31/02
[52] U.S. Cl. ........................... 228/173.1; 228/173.3; 228/173.6; 72/348; 72/709
[58] Field of Search .............. 228/173.1, 173.3, 135, 228/173.6, 189; 72/379.4, 709, 60, 63, 414, 348; 29/453, 463, 423

[56] References Cited

U.S. PATENT DOCUMENTS

| | | | |
|---|---|---|---|
| 2,754,785 | 7/1956 | Zatko | 72/348 |
| 3,066,631 | 12/1962 | Geary | 29/463 |
| 4,876,876 | 10/1989 | Ishida et al. | 72/348 |
| 4,901,552 | 2/1990 | Ginty | 72/60 |

FOREIGN PATENT DOCUMENTS 2438232  2/1975  Fed. Rep. of Germany ........ 72/709

*Primary Examiner*—Paula A. Bradley
*Assistant Examiner*—Jeffrey T. Knapp
*Attorney, Agent, or Firm*—Ostrolenk, Faber, Gerb & Soffen

[57] ABSTRACT

A method for producing a golf club head made of joined component pieces in which a mold black is split into separate first molds. Each of the first molds have a cavity patterned after one of the joined component pieces. In one embodiment, superplastic alloy plates are positioned within the first molds. The alloy plates are heated and pressurized fluid is simultaneously introduced into the cavities of the first mold for superplastic deformation of the plates. The alloy plates are then positioned within second molds and pressed to form the component pieces. The formed component pieces have shaped piece sections having small radii of curvature. The component pieces are joined to form the golf head. In another embodiment, one of the alloy plates is pressed by the second molds prior to being inserted within the first molds. The pressed alloy plate corresponds to one of the component pieces and has piece sections having a small radius of curvature. The other alloy plate, which has not been pressed by the second molds, is also positioned within the first molds. The other alloy plate has piece sections with a large radius of curvature. The alloy plates are subject to superplastic deformation as described in the first embodiment.

6 Claims, 11 Drawing Sheets

GOLF CLUB HEAD AND A PROCESS FOR PRODUCING THE SAME

BACKGROUND OF THE INVENTION

1. Field of the Invention

The present invention relates to a golf club head and a process for producing the same, and more particularly relates to improvements in mechanical properties and production of a hollow metallic golf club head of a metal wood or the like.

2. Description of the Related Art

A golf club head of this type has a planar face and a round body section including a sole, crown, heel and toe. Such a metal golf club head has conventionally been produced by precision casting from metals such a stainless steel alloys, aluminum alloys, titanium alloys and beryllium-copper alloys. Production by castings is, however, inevitably accompanied with segregation of components, generation of casting defects and coarse state of crystal particles which often exceed 0.5 mm in diameter. These factors in production usually result in poor proof stress and tensile strength of the product. Due to such low mechanical properties, it is difficult to provide the conventional metal golf club head with a thin shell construction. That is, increase in club head size unavoidably entails a thick shell construction which naturally increases the weight of the golf club head.

Thus, for the purpose of reduction in weight, a conventional metal golf club head is forced to assume a small dimension which allows provision of a very small sweet area only, thereby lowering the directional stability of the golf club head. That is, a ball struck by the golf club head does not fly correctly in the direction intended by its user.

As a substitute for such production by casting, a plastic process such as forging and pressing has lately been developed. More specifically, several pieces such as a face and a body section are first prepared by a plastic process and next joined together via, for example, welding to form a hollow main body of a metal golf club head. The body section is usually made up of two or more pieces which are joined together prior to joining to the face.

More specifically in real production via the plastic process, separate section models are prepared copying the shapes of the face, the crown and the sole of a golf club head to be produced. Next the section models are assembled together to form a hollow metallic mold. After placing an alloy plate, e.g., a Ti alloy plate, in position within the metallic mold, the mold with the alloy plate is heated up to, for example, 950° C. with concurrent introduction of high pressure inert gas such as Ar gas in order to press the alloy plate against the inner wall of the metallic mold. After continued heating for about 60 min. the shaped parts are taken out of the mold for subsequent surface finishing. A part copying the face is prepared by a separate cutting process. The parts thus prepared are joined together via welding to a golf club head main body which is then assembled with a hosel to form a golf club head.

The golf club head produced by the plastic process is free from various troubles caused by the casting process, but is still accompanied by several drawbacks mainly caused by welding employed in production for joining the shaped parts. When striking balls, the face of the golf club head warps significantly and, as a consequence, high compressive stress acts on the welded junction between the face and the body section. The welded junction is additionally exposed to bending stress which is also caused by warping of the face when striking balls. Thus, the welded junction is rather poor in mechanical durability.

Further during production, the face and the body section are prepared by separate plastic processes and joined together thereafter via welding. This joining via welding tends to lower the dimensional accuracy of the product and the separate preparation apparently lowers production efficiency.

SUMMARY OF THE INVENTION

It is thus the primary object of the present invention to provide a hollow metallic golf club head of high mechanical durability, in particular at the spot of the junction between its face and body section.

It is another object of the present invention to provide a method for producing such a golf club head via a plastic process having a high degree of dimensional accuracy of the product and high efficiency in production.

In accordance with one aspect of the present invention, a golf club head is comprised of a round body section and a monolithic face unit joined to the body section, the face unit including a face and a rear extension.

In accordance with another aspect of the present invention, a face unit and a body section are prepared from a plurality of component pieces via a plastic process, a head core is prepared from wax, the face unit and the body section are joined together on the head core and the head core is removed via melting.

In accordance with the other aspect of the present invention, a face unit and a body section are prepared from a plurality of components via a plastic process with the body section being provided with a coupling projection, the coupling projection of the body section is inserted into the face unit and the face unit and the body section are joined together.

In accordance with the other aspect of the present invention, the splittable first molds for superplastic process are prepared, each having a cavity patterned after one of component pieces making up a golf club head, the second molds for mechanical pressing are prepared, each being adapted for shaping piece sections of small radii of curvature, superplastic alloy plates are set in position within the first molds, the alloy plates are heated to their plasticizing temperature with concurrent introduction of pressurized fluid into the cavities of the first mold for superplastic deformation of the alloy plates, the alloy plates are pressed by the second molds to for the component pieces and said component pieces are joined together.

In accordance with the other aspect of the present invention, the splittable first molds for superplastic process are prepared each having a cavity patterned after component pieces making up a golf club head. The second molds for mechanical pressing are prepared, each one being adapted for piece sections of small radii of curvature. One or more plastic alloy plates are pressed by the second molds, these alloy plates corresponding to some of the component pieces having the piece sections of small radii of curvature. The pressed alloy plates and non-pressed alloy plates are set in position within the first molds. The alloy plates are heated to their plasticizing temperature with concurrent introduction of pressurized fluid into the cavities of the first molds for superplastic deformation of the alloy plates to form the component pieces, and the component pieces are joined together.

DESCRIPTION OF THE PREFERRED EMBODIMENTS

Figure 1:
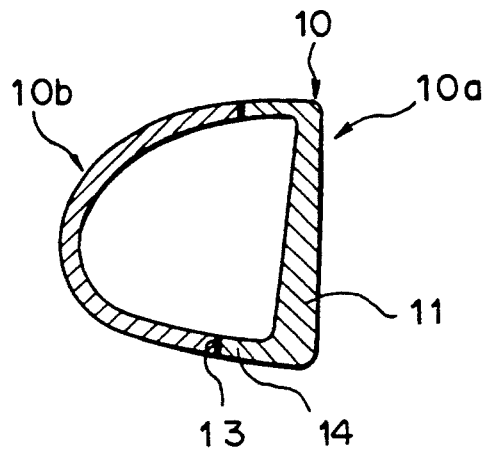
FIG. 1 is a sectional side view of one embodiment of the golf club head in accordance with the present invention.

One embodiment of the golf club head in accordance with the present invention is shown in FIG. 1, in which a golf club head 10 is made up of a face unit 10a and a body section 10b joined together as later described. The face unit 10a has a monolithic construction including substantially planar face 11 and a rear extension 14 which extends towards the rear end of the golf club head 10 from the face 11. The rear extension 14 of the face unit 10a form parts of the sole and the crown of the golf club head 10. The body section 10b is preferably made up of two or more separate pieces joined together. The body section 10b may also be in the form of a one body construction. The front end of the body section 10b and the rear end of the rear extension 14 of the face unit 10a are joined together via welding to form a welded junction 13.

Figure 2:
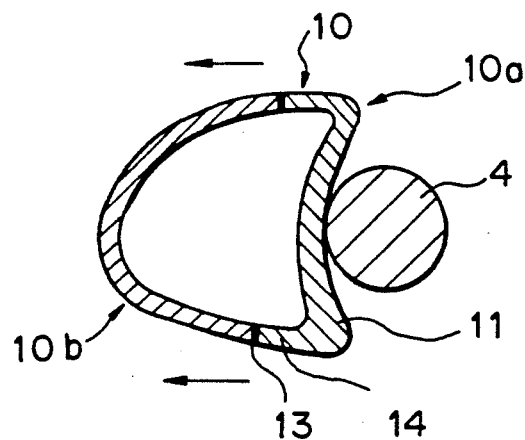
FIG. 2 is a sectional side view for showing the reaction of the golf club head shown in FIG. 1 when striking a ball.

Reaction of the golf club head 10 of such a construction when striking a ball is illustrated in FIG. 2. At the moment of impact, a ball 4 produces a reaction force on the face 11 of the golf club head 10 which thereupon warps inwards. This warping of the face 11 generates compressive and bending stresses at the boundary between the face 11 and the rear extension 14 of the face unit 10a. Nevertheless, generation of such a bending stress causes no breakage of the boundary thanks to its integral construction. The welded junction between the face unit 10a and the body section 10b is exposed to compressive stress, only without any malign influence by the bending stress generated at the boundary between the face 11 and the rear extension 13 of the face unit 10b. As a consequence, no breakage occurs at the welded junction 13.

Figure 3:
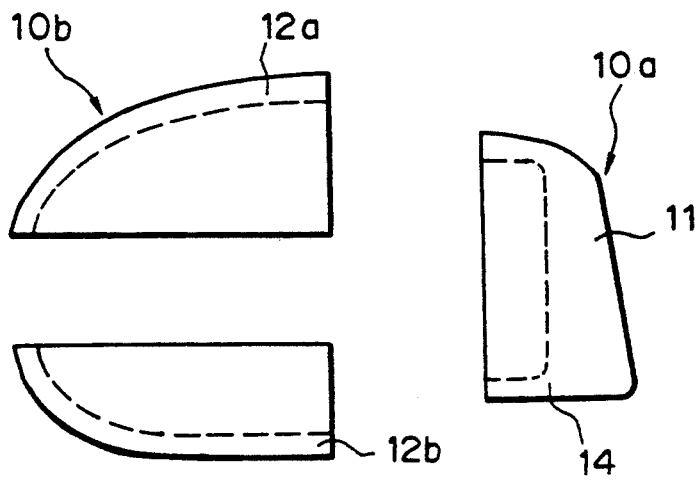
FIGS. 3 to 5 are side views, partly in section, of one embodiment of the production method in accordance with the present invention.
Figure 4:
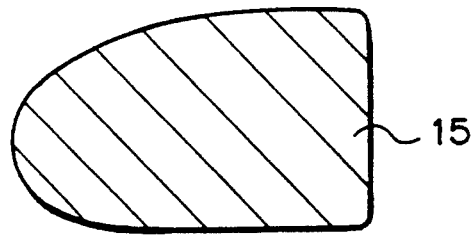
Figure 5:
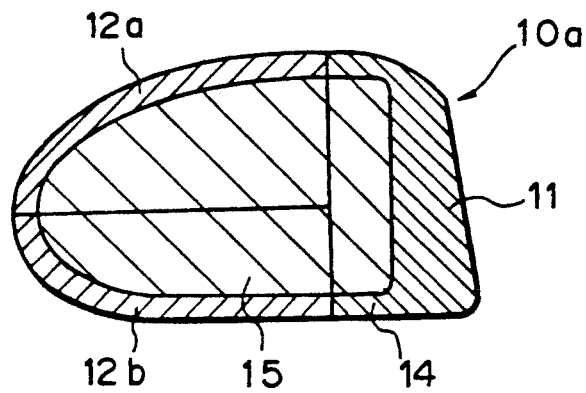

One embodiment for producing such a golf club head 10 in accordance with the present invention will now be explained with reference to FIGS. 3 to 5. First, a face unit 10a including a face 11 and a rear extension 14, a crown piece 12a and a sole piece 12b are prepared. Next a head core 15 such as shown in FIG. 4 is formed from wax. The face unit 10a, the crown piece 12a and the sole piece 12b are assembled and joined via welding together in position on the head core 15.

After complete joining, the head core 15 is heated to a temperature above its melting point for removal of the melted wax through the hosel section of the golf club head 10, thereby producing a hollow golf club head 10 such as shown in FIG. 1.

In accordance with the method of the present invention, the component pieces are assembled together on the head core 15. This mode of assembly assures high degree of accuracy in positioning of the component pieces and, as a consequence, high degree of dimensional accuracy of the product. Further high production efficiency resultes from simplified relative positioning of the component pieces on the head core. Thus tactful use of the head core 15 in accordance with the present invention brings about various improvements in production.

Figure 6:
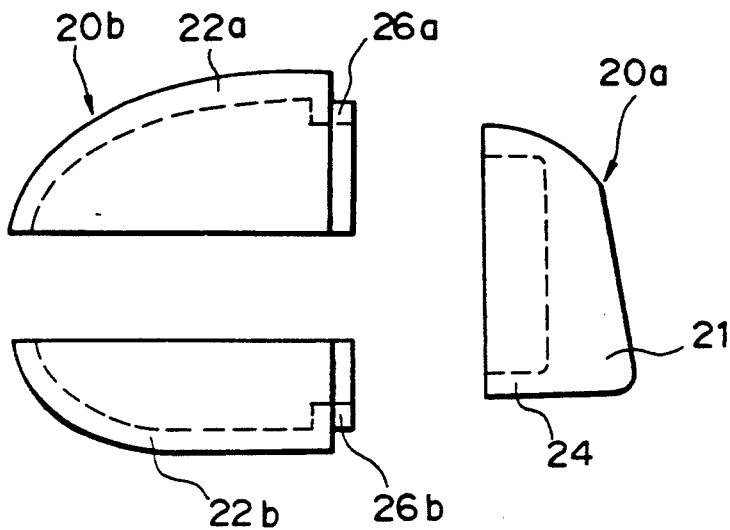
FIGS. 6 to 8 are side views, partly in section, of another embodiment of the production method in accordance with the present invention.
Figure 7:
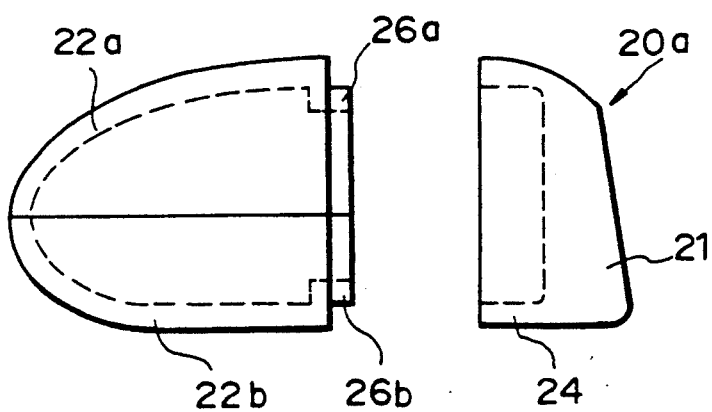
Figure 8:
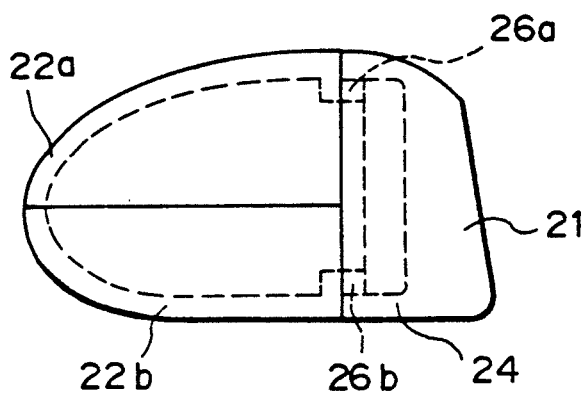

Another embodiment for producing the golf club head in accordance with the present invention will next be explained with reference to FIGS. 6 to 8. First, a face unit 20a including a face 21 and a rear extension 24, a crown piece 22a and a sole piece 22b are prepared as in the case of the first embodiment. In this case, however, the crown and sole pieces 22a, 22b are provided with arcuate projections 26a and 26b on their open front ends. When assembled together as shown in FIG. 7, the arcuate projections 26a and 26b join together to form an annular coupling projection which is fitted into the rear opening of the face unit 21 as shown in FIG. 8.

Despite no use of wax head core, the presence of the coupling projection in accordance with this embodiment assures high accuracy in positioning of the component pieces and simplifies assembly of the component pieces, thereby raising production efficiency. In addition, presence of the annular coupling projection reinforces the welded junction between the face unit 20a and the body section 20b. A wax head core may be additionally used in this embodiment too. As a substitute for advanced joining of the crown and sole pieces 22a, 22b, such as shown in FIG. 7, the component pieces prepared in the initial stage may be concurrently assembled together into the position shown in FIG. 8 for subsequent joining via welding.

Figure 9:
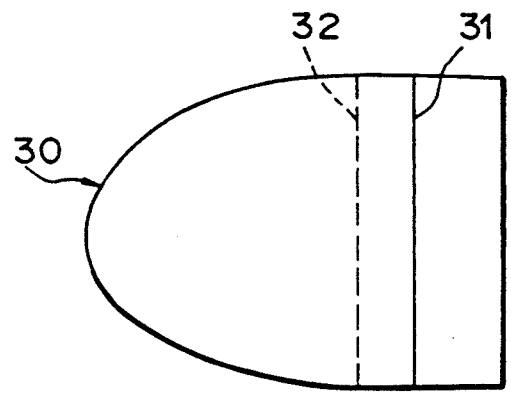
FIGS. 9 and 10 are side views for showing preparation of a mold used for the method shown in FIGS. 6 to 8.
Figure 10:
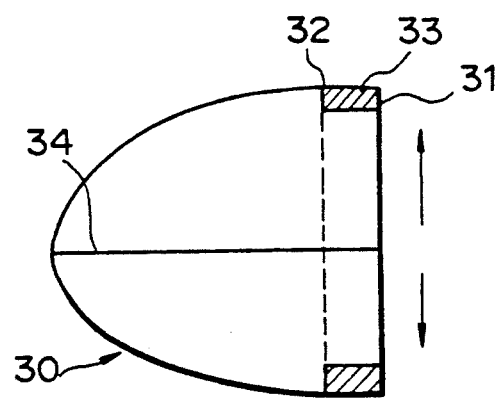

A mold for preparation of the crown and sole pieces 22a, 22b is formed in a manner such as, for example, shown in FIGS. 9 and 10. First, plastic model 30 is prepared copying the configuration of the golf club head to be produced. This plastic model 30 is cut along a cut line 31 which corresponds to the rear end of the rear extension of the face unit. Another cut line 32 is set on the rear side of the first cut line 31 and the shaded region 33 in FIG. 10 is removed by mechanical cutting. Finally, the plastic model 30 is further cut along a line 34 which runs substantially normal to the first cut line 31.

Figure 11:
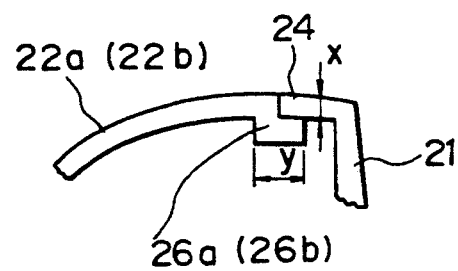
FIG. 11 is a fragmentary side view of a sample suited for measurement of the junction durability.

For evaluation of reinforcement of the junction by the coupling projection, various samples were prepared whilst varying the thickness "x" of the rear extension 24 and the depth "y" of the projections 26a forming the coupling projection (see FIG. 11). The values "x" and "y" were changed as shown in Table 1.

TABLE 1

| | Sample | | | |
|---|---|---|---|---|
| | 1 | 2 | 3 | 4 |
| x (mm) | 0.8 | 1.5 | 2.0 | 4.0 |
| y (mm) | 1.0 | 2.0 | 3.0 | 7.0 |

Each sample was hit 10,000 times in a ball striking test, but no breakage was observed.

After the striking tests, the surface gap between the crown or sole piece and the rear extension 24 of the face unit 20a was measured. The result is given in Table 2, in the form of an average of 100 sets for each sample.

TABLE 2

| | Sample | | | |
|---|---|---|---|---|
| | 1 | 2 | 3 | 4 |
| Gap (mm) | 0.04 | 0.06 | 0.07 | 0.09 |

As is clear from the experimental data, no significant gap was found in any of the samples.

The other embodiment of production of the golf club head in accordance with the present invention will be explained with reference to FIGS. 12 to 20. In the case of this embodiment, at least the face unit is made of superplastic alloy which is known to exhibit several hundreds % of elongation when subjected to heating under specified temperature conditions. Among various superplastic alloys now available in the market, stainless steel alloys, aluminum alloys, magnesium alloys, titanium alloys, Ti—Al alloys, Zn—Al alloys are preferably used for the present invention. Plasticizing temperatures of some of the alloys are shown in Table 3.

TABLE 3

| | Alloy | | | | | |
|---|---|---|---|---|---|---|
| | stainless steel | Al | Mg | Ti | Ti—Al | Zn—Al |
| Plasticizing temperature in °C. | 800–1100 | 300–600 | 250–500 | 600–1100 | 900–1100 | 200–400 |

In order to heat the superplastic alloy to the plasticizing temperature enlisted, a heater may be built in a superplastic processing mold. Alternatively, a superplastic mold may be accompanied with a separate heater.

Introduction of the fluid into the mold is carried out under a pressure of preferably 3 MPa or lower, and more preferably 2 MPa or lower. Any pressure above 3 MPa would cause uneven shell thickness of the product. The superplastic processing should preferably be conditioned so that the strain speed is in a range from $10^{-5}$ to $10^1$/S. When the strain speed exceeds this upper limit, too high a pressure might destroy the superplastic mold and cause uneven superplastic deformation. Any strain speed below the lower limit would produce crystal particles of coarse constructions due to too long exposure of the alloy plate to a high temperature.

Figure 12:
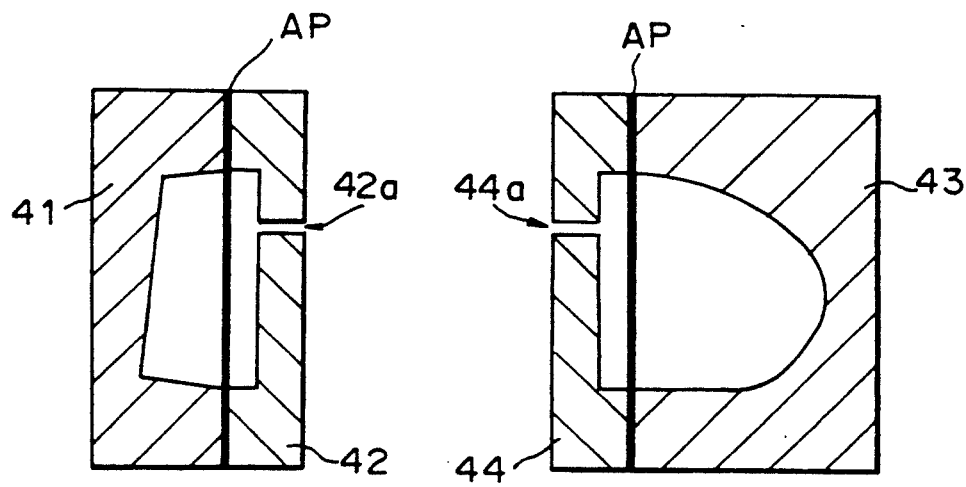
FIGS. 12 to 20 are sectional side and simplified perspective views of the other embodiment of the production method in accordance with the present invention.
Figure 16:
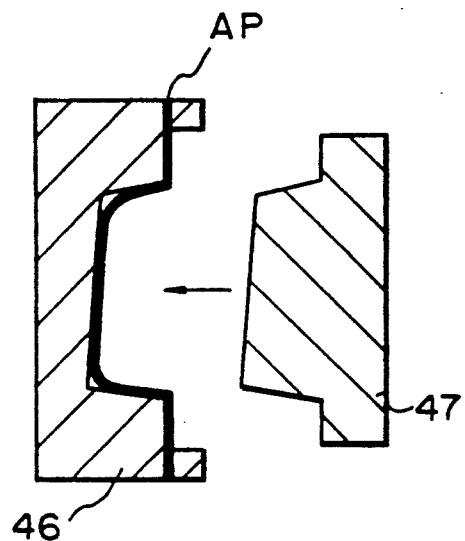

The method starts with the preparation of superplastic molds. A plastic model is formed from epoxy resin copying the configuration of a golf club head to be produced. A crude mold block is formed in the plastic model from a powdery mixture of CaO, $ZrO_2$ and $TiO_2$ whilst using methyl alcohol as a binder. The crude mold block is then cut into two molds at a position of 30 mm or shorter from the face along a cut line parallel to the face as shown in FIG. 9. After cutting, the molds are subjected to sintering at 1200° C. to obtain ceramic molds. The molds 41 and 43 thus prepared are shown in FIG. 12. In a same way, cooperating molds 42 and 44 are prepared. The cooperating molds 42 and 44 are provided with gas inlets 42a and 44a, respectively. These molds 41 to 44 are called the first molds. Molds 46 and 47 shown in FIG. 16, are for mechanical pressing for shaping piece sections of small radii of curvature. These molds 46, 47 are called the second molds.

As the preparation of molds is complete, superplastic alloy plates AP are set in position within the first molds 41 to 44 as shown in FIG. 12. For example, a square plate of 3 mm thickness and made of Ti alloy is used for molding. After setting in a molding machine, each mold-plate combinations is heated at a temperature from 750° to 850° C. During this heating, Ar gas is introduced into the molds under a pressure of 2 MPa for about 30 min. as shown in FIG. 13.

Figure 13:
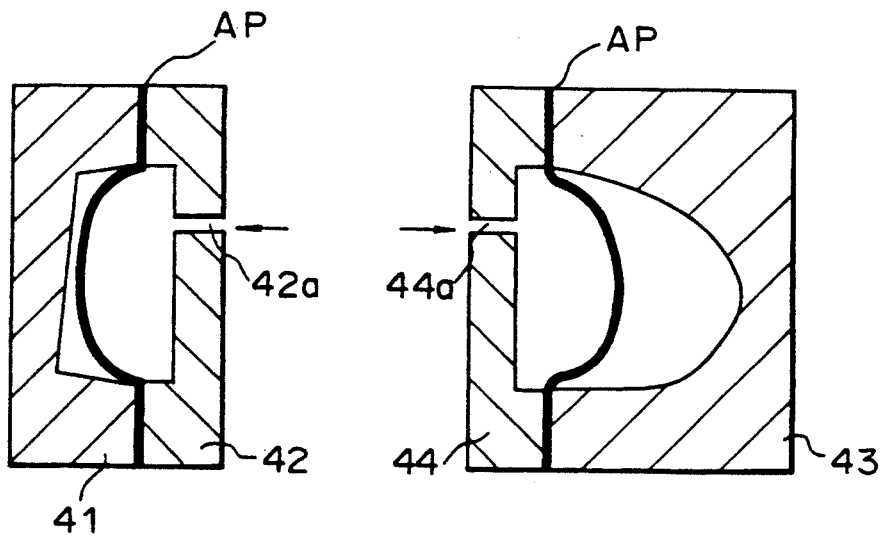
Figure 14:
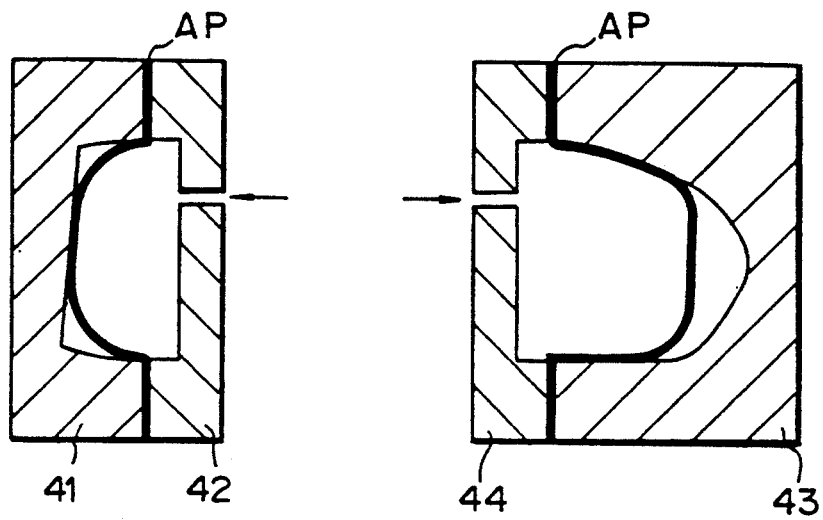
Figure 15:
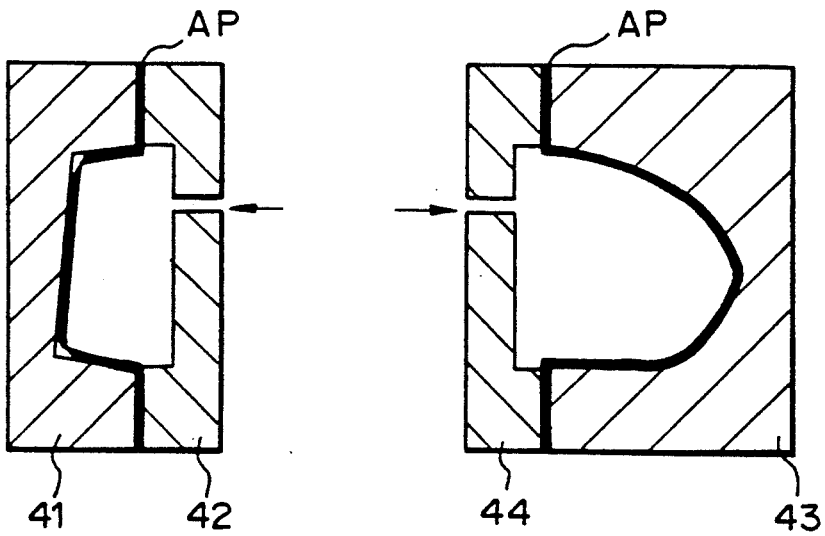

Then, each alloy plate AP undergoes gradual superplastic deformation along the interior walls of the molds as shown in FIGS. 13 to 15, except for the plate sections corresponding to the piece sections of small radii of curvature. These piece sections are generally located near the face of the golf club head.

Figure 17:
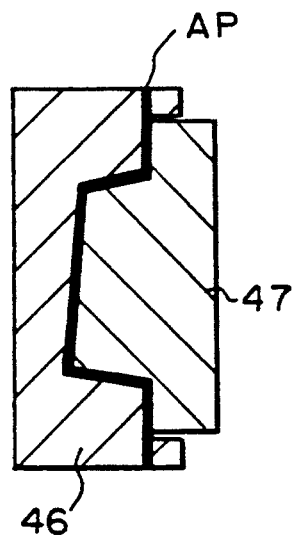

After the superplastic molding by the first molds, the alloy plate AP is taken out of the first molds and set into the second molds 46 and 47 for shaping the plate sections of small radii of curvature, as shown in FIGS. 16 and 17.

Figure 18:
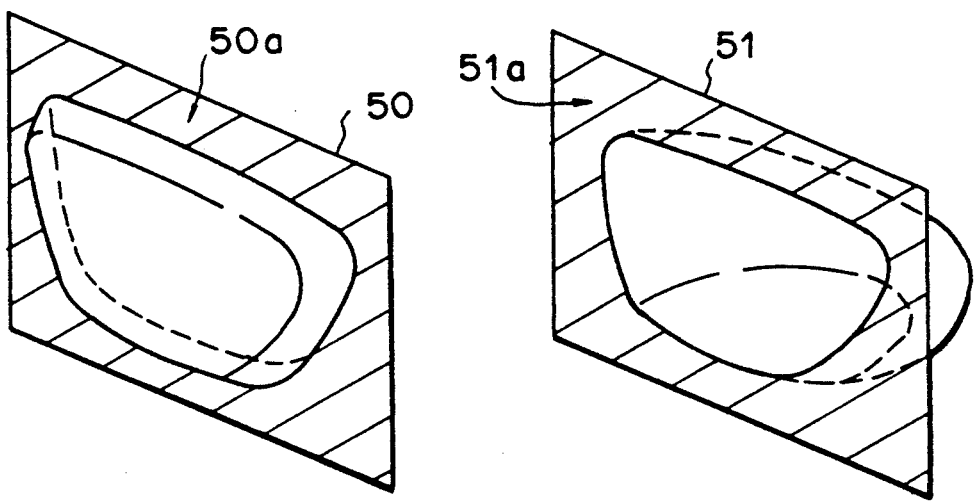
Figure 19:
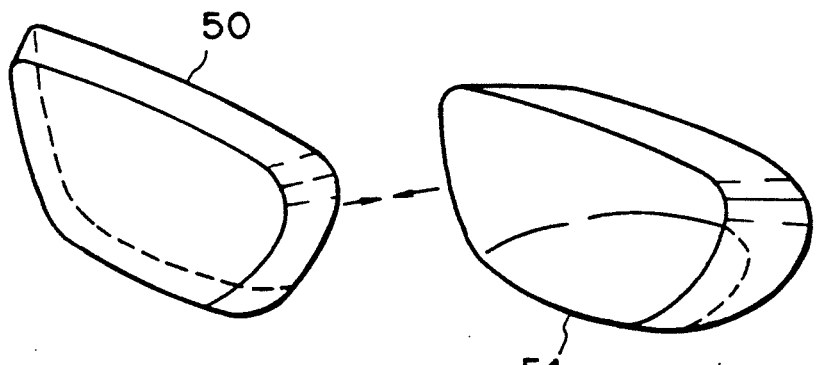
Figure 20:
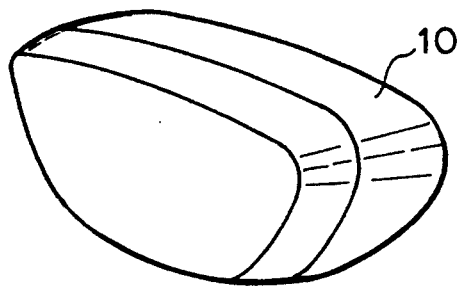

After completion of the two phased shaping, shaped alloy pieces 50 and 51 are taken out of the second molds 46 and 47 as shown in FIG. 18 and, after removal of unnecessary molding projections 50a and 51a, the shaped alloy pieces 50 and 51 are joined together to form a golf club head 10 of the present invention, as shown in FIGS. 19 and 20.

As a substitute for the ceramic molds, super hard alloys such as W—C—Co alloy may be used for formation of the mold. In this case, some of the first molds for superplastic molding can be used for mechanical pressing, thereby saving the mold cost for the second molds. In addition, mechanical pressing can be performed without demolding the alloy plate from the first molds after superplastic molding, thereby additionally reducing the total production cost.

The other embodiment of production of the golf club head in accordance with the present invention will be explained in reference to FIGS. 21 to 24. In the case of this embodiment, one or more superplastic alloy plates, which correspond to some of the component pieces having piece sections of small radii of curvature, are subjected to advanced mechanical pressing prior to the superplastic molding.

Figure 21:
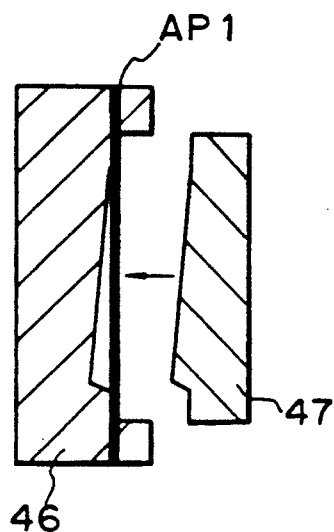
FIGS. 21 to 24 are sectional side views of the other embodiment of the production method in accordance with the present invention.
Figure 22:
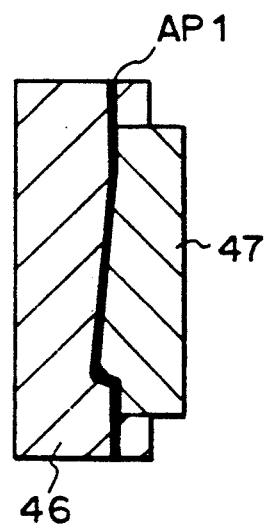
Figure 23:
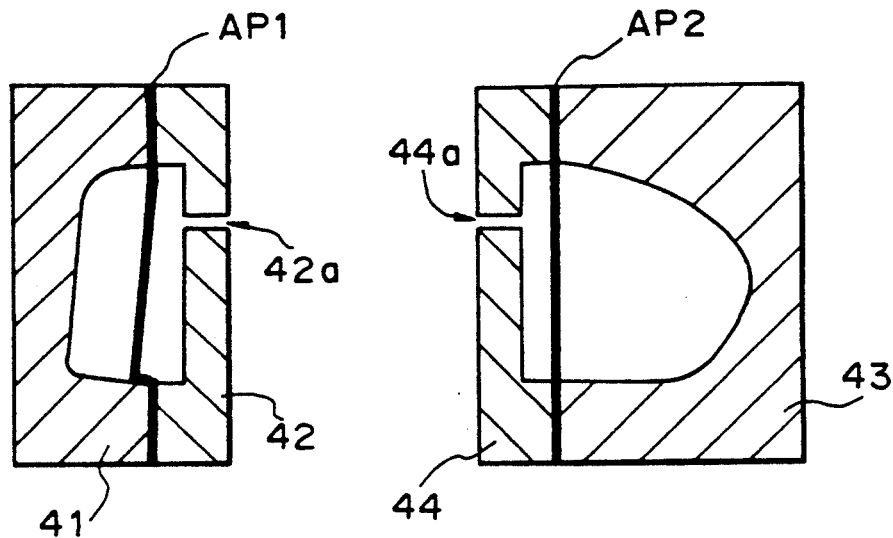

More specifically in FIGS. 21 and 22, the first superplastic alloy plate AP1 is first subjected to mechanical pressing by the second molds 46 and 47. This first alloy plate AP1 corresponds to one of the component pieces making up a golf club head and provided with at least one piece section of a small radius of curvature.

After the advanced mechanical pressing, the first alloy plate AP1 is set in position within the first molds 41 and 42. The second superplastic alloy plate AP2 is also set in position within the first molds 43 and 44. This second alloy plate AP2 corresponds to one of the component pieces making up the same golf club head and provided with piece sections of large radii of curvature only.

Figure 24:
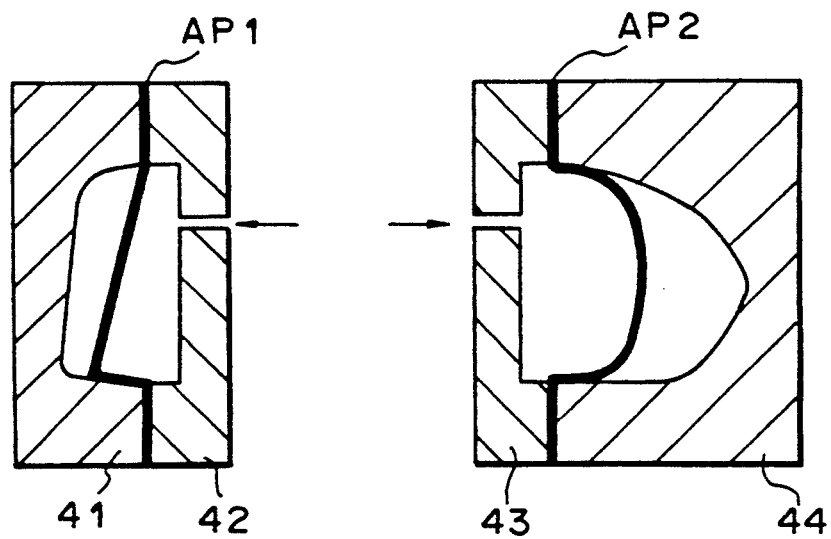

Next, pressurized fluid is introduced into the first alloys with concurrent heating to the plasticizing temperature of the alloy plates as shown in FIG. 24. The further operational steps are similar to those shown in FIGS. 14 to 15.

In accordance with the present invention, presence of the rear extension of the face unit well avoids application of bending stress to the welded junction between the face unit and the body section of a golf club head when striking balls, thereby greatly enhancing mechanical durability of the golf club head. In addition, use of the wax head core and/or the coupling projection greatly simplifies the production process and assures high degree of dimensional accuracy of the product.

Figure 25:
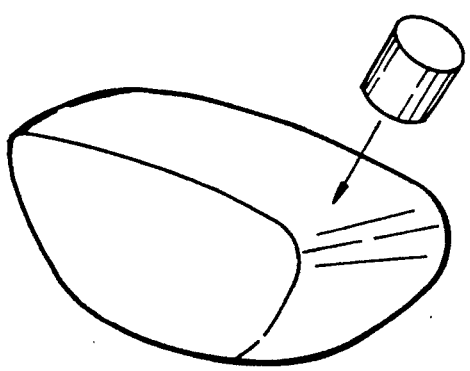
FIGS. 25 and 26 are perspective views for showing the combination of a club head with a hosel.
Figure 26:
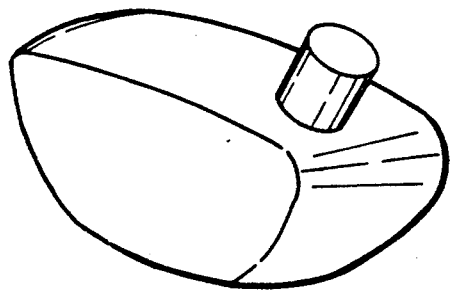

The hosel may be attached to the club head after separate formation as shown in FIG. 25 or formed in one body with the club head as shown in FIG. 26.

We claim:

1. A method for producing a golf club head made up of joined component pieces, said method comprising the steps of:

splitting a superplastic mold block into separate first molds, each of said first molds having a cavity patterned after one of said component pieces;

inserting superplastic alloy plates within said first molds;

heating said alloy plates to a plasticizing temperature;

introducing pressurized fluid into said cavities of said first molds during said heating for superplastic deformation of said alloy plates;

removing said alloy plates from said first molds;

inserting said alloy plates within second molds for mechanical pressing, each of said second molds being adapted to shaped piece sections of said alloy plates having small radii of curvature;

pressing said second molds together to form said component pieces from said alloy plates and to shape said piece sections having the small radii of curvature;

removing said shaped component pieces from said second molds; and joining said component pieces together.

2. A method as claimed in claim 1 in which
said introduction of said fluid is carried out under a pressure of 3 MPa or lower.

3. A method as claimed in claim 1 in which
said superplastic deformation in said first molds is conditioned so that strain speed of said superplastic alloy is in a range from $10^{-5}$ to $10^{1}/S$.

4. A method for producing a golf club head made up of joined component pieces, said method comprising the steps of:

splitting a superplastic mold block into separate first molds, each of said first molds having a cavity patterned after one of said component pieces;

pressing an alloy plate in second molds, each of said second molds being adapted for shaping piece sections of said alloy plate having small radii of curvature, said pressed alloy plate corresponding to one of said component piece and having piece sections of small radii of curvature;

removing said pressed alloy plate from said second molds;

positioning said pressed alloy plate and a non-pressed alloy plate within said first molds;

heating said alloy plates to a plasticizing temperature;

introducing pressurized fluid into said cavities of said first molds during heating for superplastic deformation of said alloy plates;

removing said shaped component pieces from said first molds; and joining said component pieces together.

5. A method as claimed in claim 4 in which said introduction of said fluid is carried out under a pressure of 3 MPa or lower.

6. A method as claimed in claim 4 in which said superplastic deformation in said first molds is conditioned so that strain speed of said superplastic alloy is in a range from $10^{-5}$ to $10^{1}/S$.

* * * * *